Figure 1:
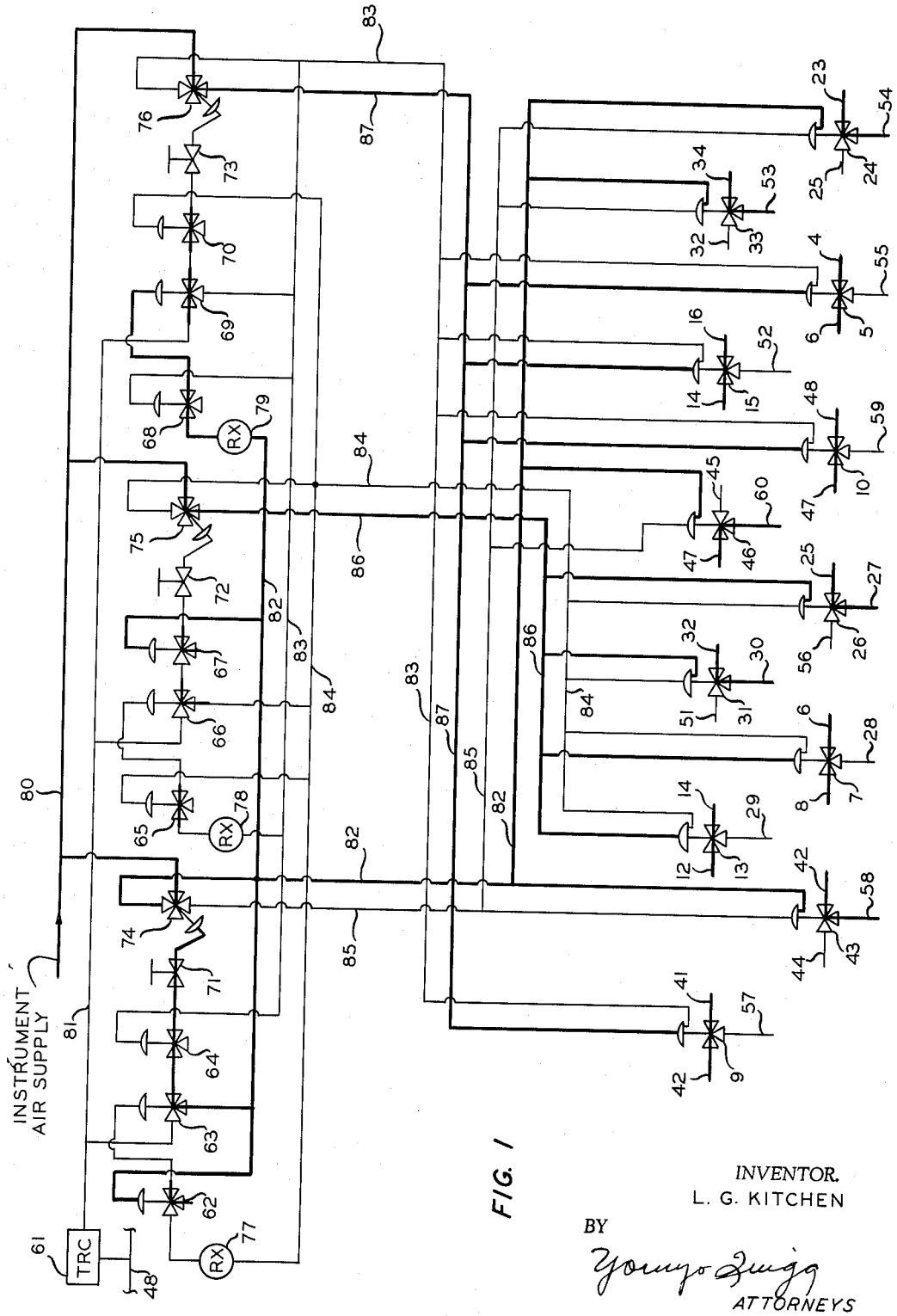

June 21, 1966  L. G. KITCHEN  3,257,314
PROCESS CYCLING

Filed May 14, 1962  4 Sheets-Sheet 1

INVENTOR.
L. G. KITCHEN
BY
ATTORNEYS

INVENTOR.
L. G. KITCHEN
BY
ATTORNEYS

United States Patent Office 3,257,314
Patented June 21, 1966

3,257,314
PROCESS CYCLING
Leland G. Kitchen, Bartlesville, Okla., assignor to Phillips Petroleum Company, a corporation of Delaware
Filed May 14, 1962, Ser. No. 194,572
6 Claims. (Cl. 210—30)

This invention relates to method and apparatus for cycling a process. In one of its aspects, the invention relates to method and apparatus for cycling a process through at least three phases in response to a predetermined on-off change in the process by actuating a first group of process valves directly responsive to the change and by actuating a second and a third group of process valves at a delayed time after the change such that, on the next occurrence of the change, the second group will be actuated directly responsive to the change and the other two of the groups will be actuated at a delayed time after the change and such that, on the third occurrence of the change, the third group will be actuated directly responsive to the change and the other two of the groups will be actuated at a delayed time after the change. In another aspect, the invention relates to method and apparatus for switching at least three adsorbers through the cycle of adsorption, regeneration, and cooling in response to the temperature of the effluent regenerating fluid such that each subsequent occurrence of the temperature's reaching a predetermined value effects a different one of at least three cyclic combinations of process valve group activations, the combinations controlling which of the adsorbers is in a given phase of the cycle.

Many processes require that the same vessel or zone serve different functions during different times or phases of the process. For example, a fixed bed of catalyst will often serve as a catalyst during one phase of a cycle and, by suitable switching of process streams, will be regenerated during another phase. During a filtration in a plate-and-frame filter, cake is being built up in the apparatus during one phase of the process, the cake is washed in situ during a next phase of the process to remove occluded impurities, the cake can be removed from the apparatus by back-flushing during a next phase, and the filter plates are pre-coated during a next phase. Removal of vapor from a gas by adsorption requires a step of adsorbent regeneration, usually by flowing hot gases therethrough, and then a step of cooling the regenerated adsorbent before the adsorbent is again ready to be put "on stream." These and many similar processes which are by their nature "batch" processes can be made continuous by providing a plurality of treating vessels and by switching the process streams among the vessels in cyclic manner such that one vessel is "on stream" while the other vessels are undergoing various other phases such as regeneration. In the past, such switching among vessels has been accomplished by a time-based program on the assumption that, on the average, each phase will require a given time for its accomplishment. It would, of course, be economically advantageous if such switching were accomplished in response to an actual measurement of some process variable, rather than on a time basis, so that for example the switching would automatically occur as soon as the pressure drop across a filter reached a predetermined value or as soon as an adsorbent had been properly regenerated, in order that the process stream would always have available to it the "freshest" possible vessel.

Figure 2:
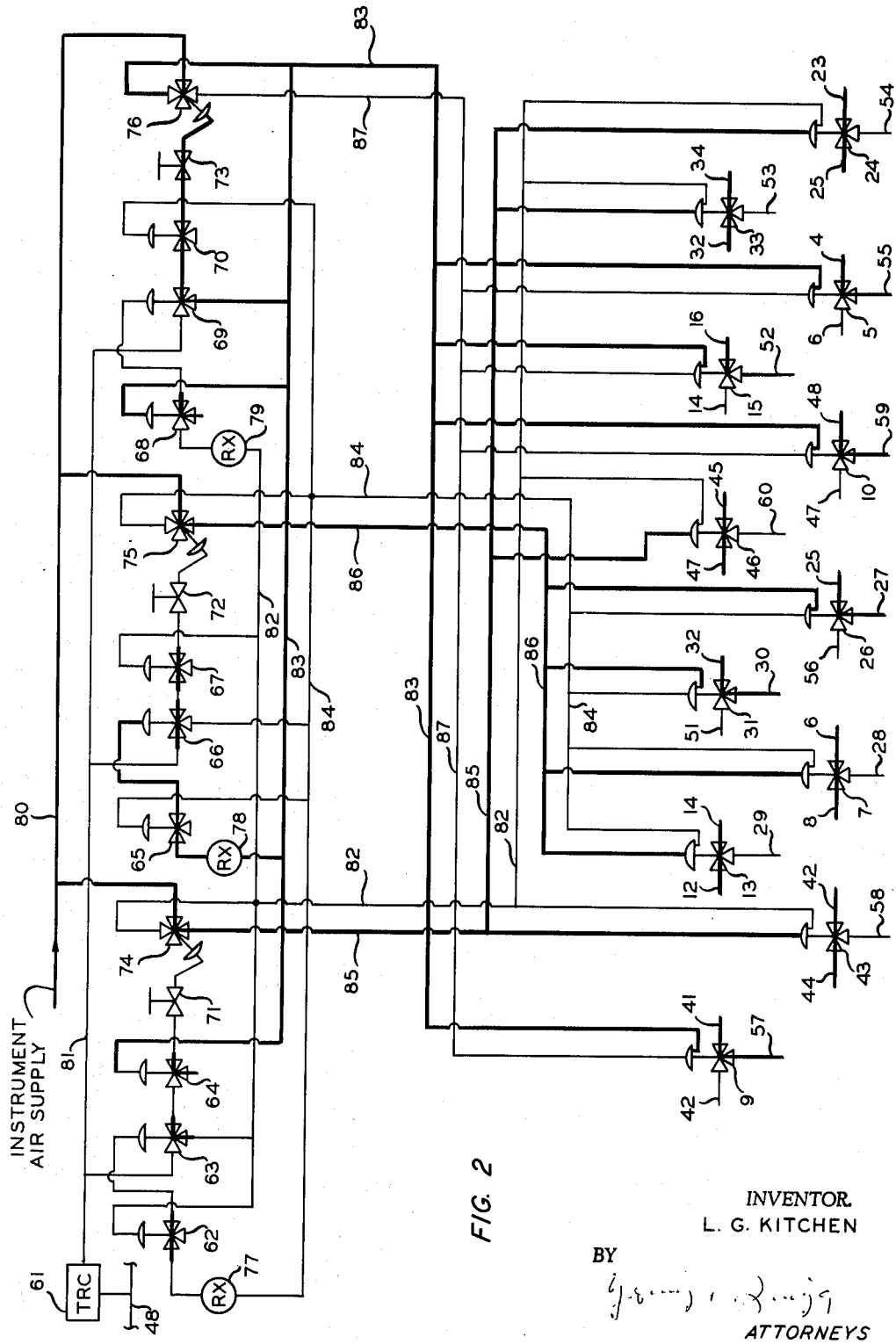
Figure 3:
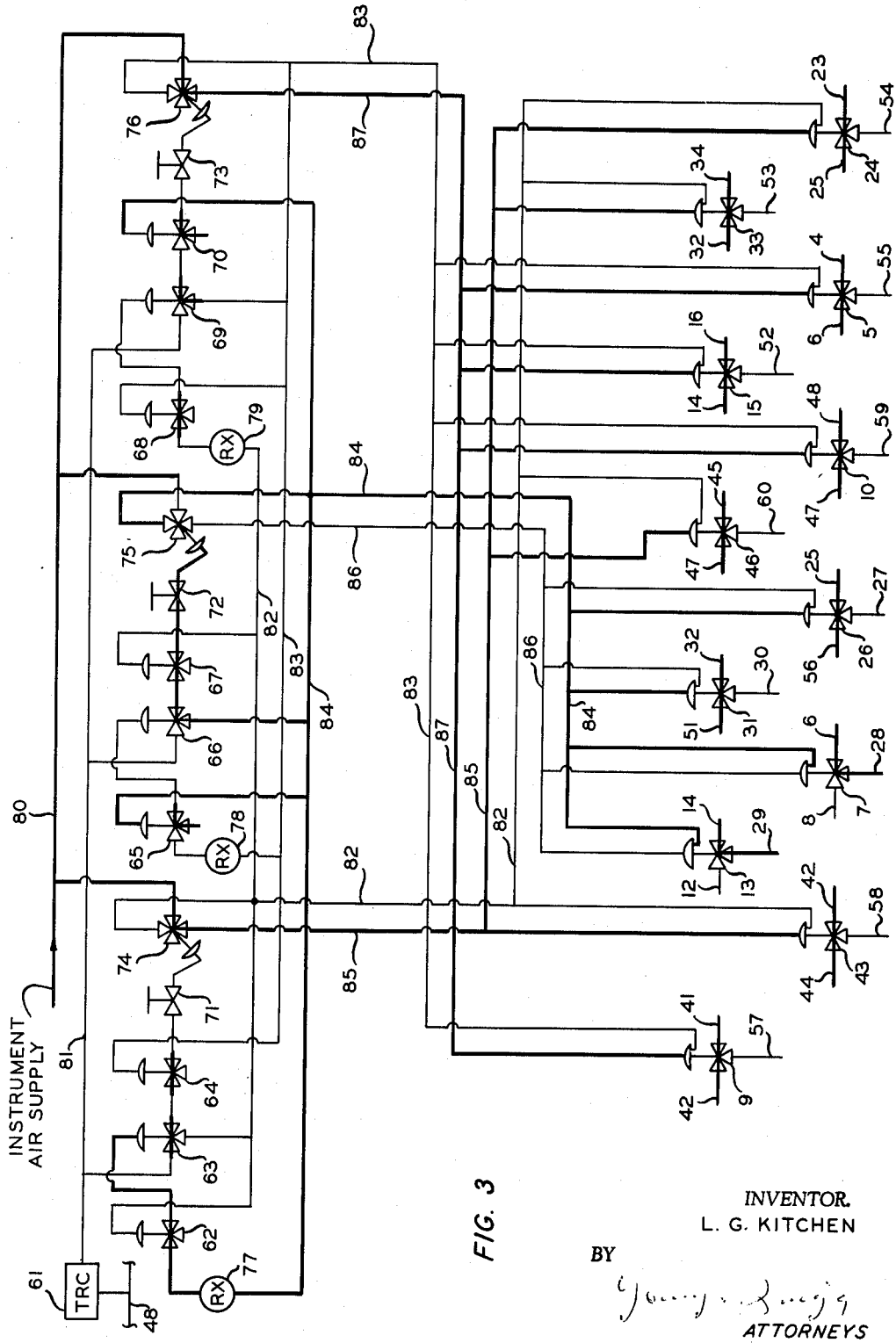
Figure 4:
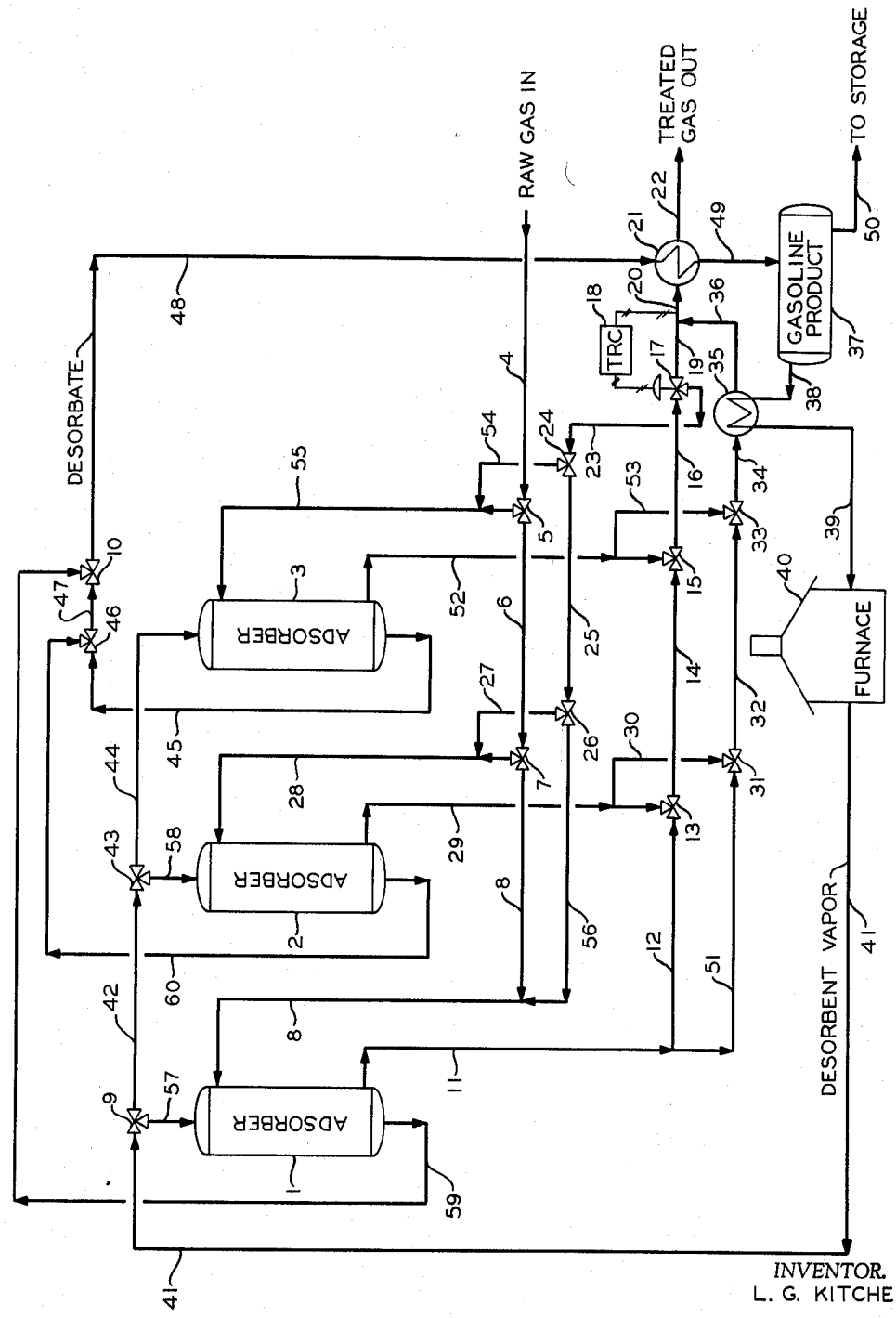

It is an object of my invention to provide method and apparatus for switching a process stream through phases of a cycle responsive to measurement of a process condition. It is another object of my invention to provide method and apparatus for switching a plurality of adsorbent beds through the cycle of adsorbing, regenerating, and cooling responsive to the effluent temperature of the regeneration fluid. It is still another object of my invention to provide method and apparatus for switching a process from one phase of its cycle to the next responsive to a measurement of a limiting variable of the process. Other aspects, objects, and the several advantages of the present invention will become apparent upon study of this disclosure, the appended claims, and the drawing in which: FIGURES 1-3 represent three stages of operation of one embodiment of the invention, and FIGURE 4 represents application of this embodiment to a cyclic adsorption process.

According to my invention, there is provided method and apparatus for regulating a cyclic process wherein a plurality of process valves are sequentially actuated to effect switching the process through phases of its cycle which comprises effecting the switching responsive to an on-off signal representative of a variable of the process. According to a presently preferred embodiment of my invention, there is provided method and apparatus for regulating a cyclic adsorption process wherein each adsorption zone undergoes the cycle phases of adsorption, regeneration, and cooling which comprises effecting the change from one phase of the cycle to the next in response to a signal produced as the temperature of the effluent fluid of the adsorption zone being regenerated reaches a predetermined value.

Referring now to the drawings for a more complete understanding of my invention, FIGURES 1-3 represent a preferred embodiment of a control system according to my invention wherein heavy lines indicate the presence of fluid under pressure; in all other aspects, these figures are identical.

A controller 61 is adapted to measure temperature (here, in conduit 48 of FIGURE 4) and to produce a continuous output signal at any time that the measured temperature exceeds a predetermined value; this signal comprises an air pressure in conduit 81. There is further provided a source of motive fluid, e.g., instrument air, in conduit 80. Three-way control valves 62–70 are pneumatically actuated such that pressure on the diaphragm motor will cause a first port to communicate with a second port, and no pressure on the diaphragm motor will cause the first port to communicate with a third port. Four-way control valves 74–76 are pneumatically actuated such that pressure on the diaphrgam motor will cause a first and a second port to communicate and a third and a fourth port to communicate, and no pressure on the diaphragm will cause the first and fourth ports to communicate and the second and third ports to communicate. Hereinafter, reference to a valve port by T, B, L, or R will refer to the top bottom, left, or right port respectively as oriented in the figure. Valves 71–73 are pressure-control valves. Items 77–79 are delay relays which serve to delay an input signal for a finite time interval before reflecting a corresponding output signal. Conduits 82–87 are connected, as shown, to the control system and to the tops and bottoms of the diaphragm operators of process valves 5, 7, 9, 10, 13, 15, 24, 26, 31, 33, 43 and 46. These latter valves will at all times have pressure either on the top or on the bottom of their diaphragms; pressure on top connects L to R, while pressure on the bottom connects B with one of L and R. Operation of the system will now be described, with the valves being initially in the positions shown in FIGURE 1 and the first colum of Table I, viz., such that (referring also to FIGURE 4) adsorber 1 is on stream, 2 is being regenerated, and 3 is being cooled. In this condition, pressure from conduit 80 passes through valve 74 via ports R and T to conduit 82, holding valves 24, 33, 43 and 46 in positions R–B, R–B, R–B and L–B respectively. Pressure from conduit 80 also passes through valve 75 via ports R and B to conduit 86, holding valves 7, 13, 26 and 31 in positions R–L, R–L, R–B and R–B respectively. Pressure from conduit 80 also passes through valve 76 via ports R and B to conduit 87, holding valves 5, 9, 10 and 15 in positions R–L, R–L, R–L and R–L respectively. As regeneration of adsorber 2 proceeds, the temperature of the effluent regeneration fluid in conduit 48 increases until it reaches the value preset in controller 61. At this time, controller 61 sends a first pressure signal through conduit 81. This signal is blocked at valves 63 and 66, but passes through ports L and R of valve 69, ports L and R of valve 70, and through pressure controller 73 to the diaphragm motor of valve 76. This causes valve 76 to switch so as to connect ports T–R and L–B. Accordingly, pressure from conduit 80 is now passed via ports R and T of valve 76 to conduit 83, conduit 87 being vented via ports B and L of valve 76, causing valves 5, 9, 10 and 15 to switch to positions R–B, R–B, R–B and R–B respectively. Pressure in conduit 83 also passes to the diaphragm motor of valve 64, causing it to switch so as to connect its ports R and B and consequently venting the pressure on the motor of valve 74 via pressure regulator 71. This venting of pressure on the motor of valve 74 causes it to switch so as to connect its ports R–B and T–L; this switching then passes pressure from conduit 80 via ports R and B of valve 74 to conduit 85, and vents conduit 82 via ports T and L of valve 74. Venting conduit 82 switches valve 62 to connect ports R and L, switches valve 67 to connect ports R and L, and slowly begins to switch valve 69 via ports R and L of valve 68 and delay relay 79. This change in conditions in conduits 82 and 85 effects switching of process valves 24, 33, 43 and 46 so as to connect their ports R–L, R–L, R–L and R–L respectively. Pressure in conduit 83 (caused by switching valve 76) is also made immediately available to the motor of valve 68 causing it to connect its ports R and B, thus immediately venting the motor of valve 69 which was previously described as having begun slowly via delay relay 79. Venting the motor of valve 69 causes it to switch so as to connect its ports B and R, thus immediately applying pressure from conduit 83 via ports B and R of valve 69, ports L and R of valve 70, and regulator 73 to the motor of valve 76; loss of signal from conduit 81 will now not affect valve 76, since it is now "locked in." It is noted that valve 75 and consequently process valves 7, 13, 26 and 31 are not affected by this sequence of events, but that pressure in conduit 83 and venting of conduit 82 switch valves 66 and 67 respectively to connect their ports L and R such that the next occurrence of a signal in conduit 81 will operate valve 75. The pressuring of conduit 83 switches valve 66 slowly because of delay relay 78; this allows dissipation of the first signal from conduit 81 so that this first signal will not operate valve 75, but the next signal will. This sequence of events just described as occurring on receiving the first signal from controller 61 will be seen to have resulted in switching the process from the initial condition of Table I, and FIGURE 1, to the middle column of Table I, or FIGURE 2, such that adsorber 1 is now being regenerated, adsorber 2 is being cooled, and adsorber 3 is on stream; moreover, the control system has been prepared for receiving the next temperature command from controller 61 by virtue of the fact that valves 66 and 67 are now aligned to pass this next signal to the motor of valve 75, it being recalled that the first temperature command operated the motor of valve 76.

The process now being on the second phase of its cycle (FIGURE 2 and middle column of Table I), the switch to the third phase, FIGURE 3 or the right column of Table I will now be described. Upon the temperature of the regeneration fluid from adsorber 1 reaching a predetermined value, a signal is again emitted from controller 61 via conduit 81. This signal is now blocked by valves 63 and 69 but passes via valves 66 and 67 and regulator 72 to the motor of valve 75, causing this latter valve to switch so as to connect ports T–R and L–B. Conduit 84 is thus pressured, and conduit 86 is vented which results in switching process valves 7, 13, 26 and 31 to connect their ports R–B, R–B, R–L and R–L respectively. Pressuring conduit 84 also switches valve 70 to connect its ports R–B, thus venting pressure on the motor of valve 76 and causing it to switch to R–B and T–L. This pressures conduit 87 from supply 80 and vents conduit 83, which steps switch process valves 5, 9, 10 and 15 to connect their ports R–L, R–L, R–L, and R–L respectively. Conduit 82 remains vented as in the previous phase, while conduit 83 is now vented and conduit 84 is now pressured. Thus, valves 63, 64, 65, 66, 68 and 69 are switched to connect their ports L–R, L–R, R–B, R–B, L–R and R–B respectively, the action of valve 63 being slowed by delay relay 77 so as to prevent operation of valve 74 by this second signal from controller 61. Valve 75 is locked in against loss of this second signal by now receiving its motive pressure from conduit 84 via valves 66 and 67 and regulator 72. It is noted that this second sequence did not affect the position of valve 74 and consequently process valves 24, 33, 43 and 46 but has resulted in preparing valve 74 for reception of a third temperature signal from controller 61 via conduit 81 and valves 63 and 64 and regulator 71. The process is now in its third phase, and the switch back to the initial phase (FIGURE 1 or Table I, left column) will be described.

Upon temperature of the regeneration fluid from adsorber 3 reaching a predetermined value, a third signal is emitted from controller 61 via conduit 81. This signal is now blocked by valves 66 and 69 but passes via valves 63 and 64 and regulator 71 to the motor of valve 74, causing this latter valve to switch so as to connect ports T–R and L–B. Conduit 82 is thus pressured, and conduit 85 is vented which results in switching process valves 24, 33, 43 and 46 to positions R–B, R–B, R–B and L–B respectively (their initial positions). Pressuring conduit 82 also switches valve 67 to connect its ports R–B, thus venting pressure on the motor of valve 75 and causing it to switch to R–B and T–L. This pressures conduit 86 from supply 80 and vents conduit 84, which steps switch process valves 7, 13, 26 and 31 to connect their ports R–L, R–L, R–B and R–B respectively (their initial positions). Conduit 83 remains vented as in the previous phase, while conduit 84 is now vented and conduit 82 is now pressured. Thus, valves 62, 63, 65, 67, 69 and 70 are switched to connect their ports R–B, R–B, R–L, R–B, R–L and R–L respectively (their initial positions), the action of valve 69 being slowed by delay relay 79 so as to prevent operation of valve 76 by this third signal from controller 61. Valve 74 is locked in against loss of this third signal by now receiving its motive pressure from conduit 82 via valves 63 and 64 and regulator 71. It is noted that this third sequence did not affect the position of valve 76 and consequently process valves 5, 9, 10 and 15 but has resulted in preparing valve 76 for reception of a fourth temperature signal from controller 61 via conduit 81 and valves 69 and 70 and regulator 73. The process now being returned to its initial phase, as shown in FIGURE 1, a complete cycle of the control system has been described.

Although my invention has been described as a pneumatic system, it is obvious that a hydraulic or an electrical system is also contemplated. The hydraulic system can operate using equipment described in conjunction with the pneumatic system. In an electrical system, valves 62–70 can be replaced by relay-operated SPDT switches with "vented" ports being grounded, regulator 71–73 can be replaced by potentiometers, valves 74–76 by relay-operated DPDT reversing switches with vented ports being grounded, delays 77–79 by capacitors, supply 80 by a reference voltage source, controller 61 by a controller producing an electrical output signal, and the diaphragm operators of the process valves 5, 7, 9, 10, 13, 15, 24, 26, 31, 33, 43 and 46 by solenoid operators with suitable amplifiers.

The following table presents the position of the valves in FIGURES 1–4 during the three above-described process phases of the cycle.

TABLE

Valves Connect Conduits [1]

| Three-Way | 1 Adsorbing<br>2 Regenerating<br>3 Cooling | 1 Regenerating<br>2 Cooling<br>3 Adsorbing | 1 Cooling<br>2 Adsorbing<br>3 Regenerating |
|---|---|---|---|
| 62 | R–B | L–R | L–R |
| 63 | R–B | [2]R–B | [2]L–R |
| 64 | L–R | R–B | L–R |
| 65 | L–R | L–R | R–B |
| 66 | [2]R–B | [2]L–R | R–B |
| 67 | R–B | L–R | L–R |
| 68 | L–R | R–B | L–R |
| 69 | [2]L–R | R–B | [2]R–B |
| 70 | L–R | L–R | R–B |

| Four-Way Valves | (Conduits 82, 86, 87 Pressured) | (Conduits 83, 85, 86 Pressured) | (Conduits 84, 85, 86, Pressured) |
|---|---|---|---|
| 74 | T–R, B–L | T–L, B–R | T–L, B–R |
| 75 | T–L, B–R | T–L, R–R | T–R, B–L |
| 76 | T–L, B–R | T–R, B–L | T–L, B–R |

| Process Valves | | | |
|---|---|---|---|
| 5 | 4–6 | 4–55 | 4–6 |
| 7 | 6–8 | 6–8 | 6–28 |
| 9 | 41–42 | 41–57 | 41–42 |
| 10 | 47–48 | 48–59 | 47–48 |
| 13 | 12–14 | 12–14 | 14–29 |
| 15 | 14–16 | 16–52 | 14–16 |
| 24 | 23–54 | 23–25 | 23–25 |
| 26 | 25–27 | 25–27 | 25–56 |
| 31 | 30–32 | 30–32 | 32–51 |
| 33 | 34–53 | 32–34 | 32–34 |
| 43 | 42–58 | 42–44 | 42–44 |
| 46 | 47–60 | 45–47 | 45–47 |

[1] "T" is to port, "L" is left port, "R" is right port, "B" is bottom port.
[2] Actuation delayed by one of delays 77, 78, 79.

FIGURE 4 represents the cyclic adsorption process which is controlled by the above-described embodiment of my invention; this process is disclosed and claimed in co-pending application Serial No. 172,713 filed February 12, 1962.

Although my invention has been described in conjunction with an adsorption process, it is obvious to one skilled in the art that it is not so limited, but rather is applicable to numerous cyclic processes, "batch" in nature but made continuous by employing a plurality of units in parallel, wherein it is desirable to effect switching of the units through the phases of their cycle in response to a variable of the process. Further, although the switching has been described as being responsive to tempearture, it is obvious that measurement of other process variables such as pressure, flow rate, density, etc., will be advantageous depending upon the process being carried out.

Reasonable variation and modification are possible within the scope of this disclosure, drawing, and appended claims to the invention, the essence of which is that there is provided method and apparatus for controlling the phases of a cyclic process which comprises effecting the switching of the process through the phases of its cycle in response to a signal representative of a process variable.

I claim:

1. The method of controlling a cyclic adsorption process wherein each of a plurality of adsorption zones undergoes the phases of adsorption, regeneration, and cooling during the cycle which comprises regenerating one of said zones with a regeneration fluid, automatically effecting the switching from one to the next of said phases in response to a signal representative of the temperature of the adsorption zone being regenerated reaching a predetermined value, and continuing said process in said now-switched zones.

2. Process control apparatus for controlling an adsorption process comprising a plurality of similar adsorption processing vessels, a source of fluid to be processed, a point of utility for processed fluid, conduit means communicating among said source and said point of utility and said processing vessels, a plurality of process valves in said conduit means adapted to direct the flow of process fluid from said source to various of said processing vessels and thence to said point of utility, signal generating means adapted to sense a condition of said process fluid and to produce a signal when the value of said condition equals a predetermined value, and means responsive to said signal generating means adapted to actuate said process valves step-wise through each phase of a predetermined cycle so as to control the operation of each of said processing vessels on said process fluid upon each occurrence of the producing of said signal.

3. Apparatus adapted to remove liquid from a process stream by sorption wherein said process stream is passed through one of a plurality of sorption vessels to accomplish sorption of liquid from said stream and a second of said plurality of sorption vessels is at the same time regenerated by passage therethrough of a hot regeneration fluid comprising a source of said process stream, a source of hot regeneration fluid, conduit means communicating among said sources and said plurality of sorption vessels, process valve means in said conduit means, temperature sensing means in one of said conduit means adapted to sense the temperature of the effluent from said sorption vessel which is being regenerated and to produce a signal when the value of said temperature reaches a predetermined value, and means responsive to said temperature sensing means adapted to actuate said process valve means so as to switch the flow of said process stream and said hot regeneration fluid step-wise according to a predetermined cycle among said plurality of sorption vessels upon each producing of said signal.

4. Apparatus of claim 3 wherein there is further provided a source of cooling fluid and conduit means communicating among said sources and said plurality of sorption vessels and wherein said cycle comprises for a given of said vessels the sequence of sorption, regeneration, and cooling.

5. Apparatus of claim 4 wherein said process stream comprises raw natural gas, said liquid comprises natural gas liquid, and said hot regeneration fluid and cooling fluid comprise respectively a vaporized portion of said natural gas liquid and a residue portion of natural gas treated by said sorption.

6. The method of controlling a cyclic adsorption process wherein each of a plurality of adsorption zones undergoes the successive phases of adsorption, regeneration and cooling during the cycle which comprises;

(a) adsorbing in a first of said plurality of zones a fluid to be adsorbed, simultaneously regenerating a second of said plurality of zones with a regeneration fluid, and cooling a third of said plurality of zones with a cooling fluid, (b) measuring the temperature of the effluent from said first of said plurality of zones and automatically effecting the switching of (1) feed from the said first of said plurality of zones to the said third of said plurality of zones, (2) regeneration fluid from said second of said plurality of zones to said first of said plurality of zones and (3) cooling fluid from said third of said plurality of zones to said second of said plurality of zones in response to a signal representative of the temperature of the adsorption zone being regenerated reaching a predetermined value, (c) continuing said process in said now-switched zones until a temperature measurement of the effluent of the zone now acting as an adsorbing zone reaches the said predetermined value, and (d) automatically switching the said first, second and third of said plurality of zones so that each is performing the function of the next preceding zone and continuing the now-switched process until a temperature measurement of the effluent from that zone which is functioning as an adsorbing zone reaches the said predetermined temperature whereupon the process will be returned to the initial condition detailed in step (a).

References Cited by the Examiner
UNITED STATES PATENTS 2,464,311   3/1949   Hiatt et al. _____ 210—264

OTHER REFERENCES

Dow, W. M., Advances in Petroleum Chemistry and Refining, vol. IV, November 1961, pages 90–97 relied upon.

MORRIS O. WOLK, *Primary Examiner.*